July 13, 1954     R. W. McKINLEY ET AL     2,683,282
FEATHER PLUCKING FINGER
Filed April 30, 1952
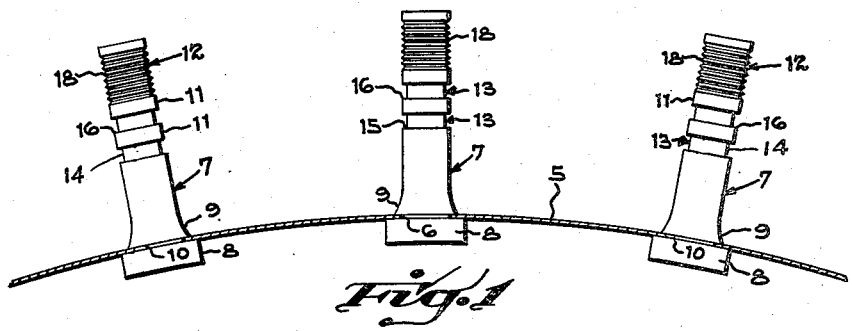
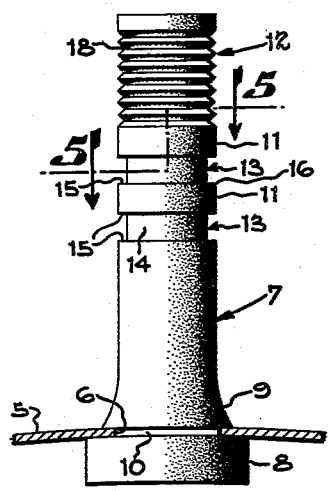
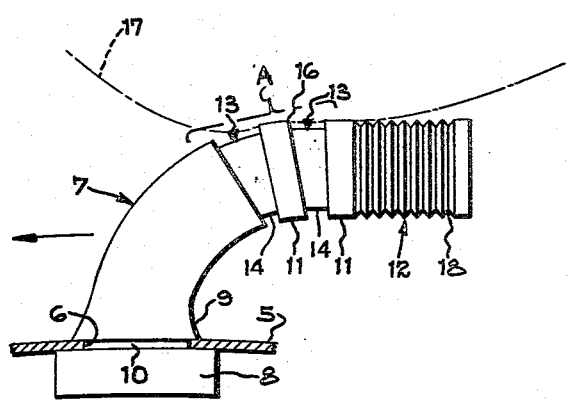
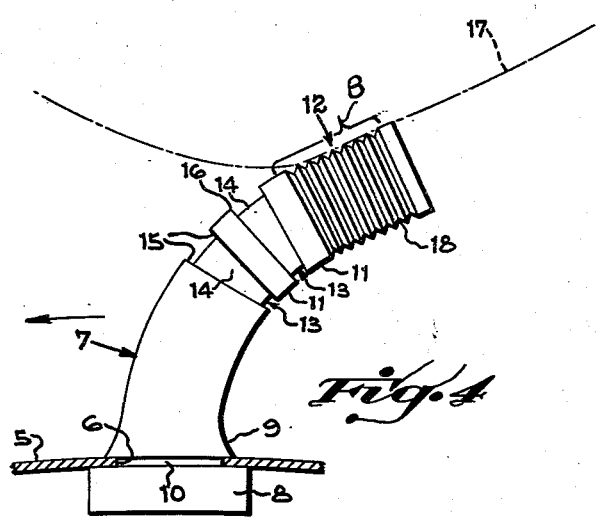
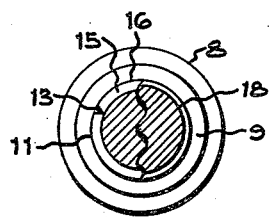
INVENTORS.
Robert W. McKinley.
BY J. Howard Ernstes.
Wood, Herron & Evans.
ATTORNEYS.

Patented July 13, 1954

2,683,282

UNITED STATES PATENT OFFICE 2,683,282

FEATHER PLUCKING FINGER

Robert W. McKinley and Joseph Howard Ernstes, Greensburg, Ind., assignors to The Ashley Machine Company, Greensburg, Ind., a corporation of Indiana Application April 30, 1952, Serial No. 285,216

2 Claims. (Cl. 17—11.1)

This invention relates to an improved plucking finger for power operated poultry defeathering machines. The improved finger is of the relatively stubby stiff type generally used on manually controlled machines as distinguished from the long flexible type used on automatic machines.

Essentially, the manual defeathering machine consists of a rotary drum which is driven by an electric motor, the drum having flexible rubber plucking fingers extending radially about its entire circumference. The manual machines are used both in performing the complete plucking operation and also in conjunction with automatic machines in the removal of feathers which are missed by the automatic machines.

A manually controlled machine of the type for which the present fingers are particularly intended, is disclosed in the patent to George R. Hunt No. 2,300,157. As disclosed in the Hunt patent, the plucking operation consists of presenting the fowl, which is usually scalded, against the rotating drum under controlled pressure such that the feathers are pulled from the carcass by the frictional engagement of the moving fingers. For best results, the direction of drum rotation is counter to the lay of the feathers to increase the purchase of the moving fingers with the feathers. The drum is rotated at a relatively rapid rate, and during the operation, the carcass is turned about so as to expose its various surfaces to the action of the advancing fingers. The operation is continued until the skin of the fowl is completely cleaned of feathers.

The feathers of poultry differ in character from the outer covering feathers to those which lie underneath, the outer feathers generally being larger and more firmly anchored than those which lie underneath and immediately adjacent the skin. It has been discovered that the defeathering operation is performed most efficiently by applying a rather heavy pressure during removal of the outer feathers and applying a lighter pressure during removal of the under feathers. In other words, the operation is best performed in two stages, the first providing maximum pressure and frictional engagement and the second involving less pressure and friction. If the entire operation were performed under the pressure required for the outer feathers, then the carcass of the fowl would be bruised and otherwise damaged by the harsh action of the rubber fingers in scraping across the bare skin.

A primary object of the present invention has been to provide a plucking finger which is provided with two plucking sections, the first being presented to the fowl under relatively heavy pressure and being highly effective in plucking the outer feathers, the second section being presented to the fowl under lighter pressure and being effective to pluck fine under feathers without damage to the bare skin.

To obtain this result, the plucking finger is in the form of a cylinder formed of rubber or equivalent material having predetermined flexibility and bending resistance. The low pressure plucking section consists of a plurality of relatively fine annular corrugations delineated by fine grooves formed in the outer end portion of the finger. The high pressure plucking section is located intermediate the length of the finger and consists of a plurality of coarse annular corrugations delineated by coarse grooves formed in the finger. The grooves of the coarse corrugations reduce the cross section of the finger, thereby providing a localized bending area intermediate the length of the finger. The localized bending area yields to allow the low pressure section at the outer end portion of the finger to be deflected to an inoperative angle during the coarse plucking operation so as to present the coarse corrugations to the fowl. During the fine plucking operation, the bending area presents the low pressure section to the fowl at a decreased angle and at correspondingly decreased pressure. The external cylindrical surfaces of both sets of corrugations are flush with one another and with the cylindrical surface of the finger.

During the plucking operation, therefore, the fowl must be pressed against the rotating fingers with a substantially greater amount of pressure to present the coarse corrugations than is required to present the fine corrugations. Thus, the coarse corrugations are adapted to remove the coarse outside feathers under heavy pressure in a rapid efficient manner, but without damage, the skin of the fowl being protected by the feathers themselves. After removal of the outer feathers, the pressure is reduced allowing the finer corrugations to be presented to the relatively bare carcass, these corrugations being highly efficient in removing the residual feathers without scuffing or bruising the skin.

In practice, the coarse corrugations extend toward the free end of the finger from a point intermediate the length of the finger toward its outer end and the fine corrugations are located adjacent the coarse and extend continuously to the outer end of the finger. The coarse corrugations are delineated by relatively wide grooves extending circumferentially around the finger, thus providing necks of reduced diameter.

A further object of the invention has been to concentrate the pressure and friction by the provision of coarse corrugations which present relatively sharp corners to the outer feathers and to provide less concentrated engagement under lighter pressure so as to remove most efficiently both the outer feathers and under feathers. For this purpose, the coarse corrugations comprise square cut annular rings of substantial width, delineated by wide grooves, the square profile of the rings providing relatively sharp corners which are drawn across the feathers. The finer section comprises a series of relatively fine concentric V-shaped rings which are found to be most efficient in plucking the fine under feathers and in removing the yellow pigment which covers the skin proper if such removal is necessary.

Further objects and advantages of the invention are disclosed in the following description in conjunction with the drawings.

In the drawings:

Figure 1 is a fragmentary view showing a portion of the drum of a poultry picking machine, showing generally the relationship of the improved plucking fingers.

Figure 2 is an enlarged view of one of the fingers in its normal position with respect to the drum.

Figure 3 is a view similar to Figure 2 showing the action of the finger under relatively heavy pressure in removing the coarse outside feathers from the fowl during the first stage of the operation.

Figure 4 is a view similar to Figure 3, showing the action under relatively light pressure for removing the under feathers during the final stage of the defeathering operation.

Figure 5 is a sectional view taken along line 5—5, Figure 2, showing the differential diameters of the finger at the coarse and fine corrugations.

As explained above, the improved fingers are intended to be utilized in picking machines, following the plucking principle disclosed in the Hunt patent, in which the fowls are engaged against the rotating drum under controlled pressure. The drum of the machine is rotated by means of an electric motor at a fairly high rate of speed and the fingers normally extend radially from the drum as indicated in Figure 1. The fingers are formed of rubber or equivalent flexible and elastic material and the fowl is held in operating engagement against them so that the radial fingers are deflected in a direction opposite to the rotation of the drum and dragged across the surface of the fowl as shown in Figures 3 and 4. Because of the frictional resistance of the rubber fingers with respect to the feathers, the feathers are rapidly removed during the repeated passes of the fingers across the surface of the fowl.

Referring to Figure 1, the drum of the defeathering machine is indicated at 5 and in the present disclosure, is formed of relatively thin sheet metal provided with apertures 6 around its entire circumference. The plucking fingers, indicated generally at 7, are generally cylindrical and are anchored in the apertures. For this purpose they are provided with an enlarged cylindrical base 8, the finger being substantially the same in diameter as the aperture 6, such that the finger is installed by inserting it through the apertures from the inside of the drum and forcing it in a radial direction outwardly.

Upon being inserted, the cylindrical finger passes readily through the aperture 6 until the tapered fillet 9 begins to wedge in the opening. A pulling force is then exerted upon the extended end of the finger which is effective to compress the tapered fillet 9 and draw it through the opening, bringing the base 8 into engagement with the internal surface of the drum. A narrow groove 10, which is substantially the same diameter as the finger, is formed between the bottom of the fillet and base; thus, after passing through the opening, the tapered fillet expands to its original size, causing it to overlie the margin of the opening, thereby anchoring the finger securely to the drum.

Upon being anchored, the finger is capable of resisting any normal displacement force outwardly of the drum as shown in Figures 3 and 4 by the combined engagement of the base and fillet against the opposite sides of the drum. If after prolonged service the finger becomes worn and must be replaced, it can be removed by forcing it axially in the opposite direction, causing the tapered fillet 9 to be distorted in the opposite direction and allowing the finger to be passed inwardly through the opening. In practice, a suitable lubricant is applied to the fingers to reduce friction and thereby to facilitate the installation and removal of the fingers.

The two plucking stages are performed respectively by the coarse corrugations indicated at 11 and the fine corrugations indicated at 12. It will be observed that the coarse and fine corrugations collectively extend approximately over one-half of the length of the finger, starting at its outer end and continuing to an intermediate point longitudinally of the finger.

In its preferred embodiment, the portion of the finger projecting outwardly from the drum is approximately 3" long and ¾" in diameter. The coarse corrugations 11 are delineated by annular grooves 13 formed in the surface of the cylindrical finger, the first groove being located intermediate the length of the finger. The grooves 13, which are two in number, are approximately ¼" wide and 1/16" deep and delineate the two annular corrugations 11 which are approximately ¼" wide. The grooves 13 are generally U-shaped in profile, having a flat bottom 14 joined by right angular walls 15—15. The grooves 13 thus form a reduced neck portion providing a localized bending area, and the annular corrugations 11, which the grooves delineate, have square corners 16.

The pull exerted by the high pressure plucking section is concentrated upon a relatively small surface area of the fowl and produces a strong frictional engagement with respect to the larger feathers to facilitate their removal. A portion of the fowl is indicated at 17 by the broken lines in Figures 3 and 4 and, during the plucking operation, the drum is rotated in the direction indicated by the arrow.

Referring to Figure 3, it will be noted that the low pressure plucking section is deflected to an inoperative angle when the fowl is held against the finger at high pressure. This causes the localized bending area to yield and present the high pressure section, indicated at A, to the fowl. As shown in Figure 4, the localized bending area presents the low pressure section, indicated at B, to the fowl at a decreased angle when the fowl is held against the finger at lower pressure.

After the coarse feathers have been removed by the high pressure section A, continued application of heavy pressure would scuff or bruise the skin and detract from the market value of the fowl. In other words the coarse section provides a highly efficient and rapid plucking action but can be utilized only while the coarse outer feathers are on the fowl. Therefore, after the coarser feathers have been plucked, the operator reduces the pressure, causing the low pressure section to contact the fowl at the reduced angle and pressure as indicated at B. The pressure required to deflect the fingers to this angle is roughly one half that required to deflect it to the position shown at B by operation of the localized bending area.

The corrugations of the fine plucking section are delineated by relatively shallow V-shaped annular grooves 18 formed in the surface of the cylindrical finger. The V-shaped grooves thus delineate V-shaped corrugations, the outer edges being flush with the surfaces of the coarse corrugations and with the surface of the cylindrical finger. This configuration is found to be highly efficient in the complete plucking of fine feathers and the removal of the yellow pigment covering the skin proper, as explained later.

During the plucking operation, the fowl necessarily is turned as the operation progresses in order that all parts of it may be cleaned thoroughly. The fowl usually is grasped by the feet during the operation and the drum is rotated in a direction opposite to the lay of the feathers since this is found to produce the most efficient plucking action. After the outer feathers of a given area have been removed by the coarse plucking section, that portion may be immediately cleaned of fine feathers by reducing the pressure of the fowl. On the other hand, the entire carcass may be first cleaned of the coarse feathers followed by a second operation under light pressure at the choice of the operator.

In cleaning the carcass, it is necessary to remove the feathers from beneath the wings and since the wings are rather fragile and easily broken, this operation is performed under light pressure with the fine finger section engaged.

It has been discovered in actual practice that the improved finger produces a substantial increase in plucking speed over the fingers formerly used and also provides more thorough cleaning. This is brought about by the two disparate plucking sections, each being capable of plucking at maximum efficiency its particular type of feather. Otherwise expressed, the two sections provide two separate operations, the coarse feathers being plucked at maximum rate by the coarse section, and the fine feathers being plucked at maximum rate by the fine section, thereby producing an overall increase in efficiency.

In dressing poultry, the yellow pigment to which reference was made earlier, is removed from certain grades while in other grades it is left intact. This yellow hue is known in the poultry trade as "bloom" and is indicative of good quality in certain grades, but in any event, uniform coloration is highly desirable whether the pigment is retained or removed. When the pigment is to be retained, the birds are scalded at a temperature ranging from 128° to 132° and when the pigment is to be removed, a temperature of 135° to 145° is applied. The two scalding temperatures are known in the trade respectively as slack scalding and hard scalding.

When it is desired to leave unmarred the yellow pigment of slack scalded birds, it is ordinarily most difficult to remove all the feathers without marring the bloom by the application of too much pressure and friction. However, the fine section of the finger is found in practice to provide a clean picking operation without marring the natural bloom of the bird because of its rather delicate action upon the skin surface.

When using a hard scald, it is desirable to remove the pigment evenly, but without bruising the skin proper. It is found that the fine picking section is effective to remove completely the pigment from the hard scalded birds and thereby to produce a uniform skin color without bruising. Hard scalding apparently loosens the yellow pigment, leaving it in condition for removal; thus, the fine finger section performs either operation efficiently depending only upon the type of scald.

Having described our invention, we claim:

1. A feather plucking finger adapted to be installed on the rotary drum of a fowl defeathering machine, said finger providing selectively a high pressure plucking action for removing outer feathers and a low pressure plucking action for removing inner feathers in response to the pressure of the fowl against the finger, said finger having a base adapted to anchor the finger upon the periphery of the rotary drum with the finger projecting radially therefrom, the projecting portion of the finger being cylindrical, said finger formed of flexible rubber having a substantial bending resistance, the finger having a low pressure plucking section at its outer end portion, said section comprising a plurality of relatively fine annular corrugations, a high pressure plucking section intermediate the length of the finger, said high pressure plucking section comprising a plurality of coarse annular corrugations delineated by annular grooves, each of said coarse grooves being at least twice the width of one of said fine corrugations, the exterior surfaces of the coarse and fine corrugations being flush with one another and with the cylindrical surface of the finger, said coarse annular grooves reducing the cross section of the finger and providing a localized bending area intermediate the length of the finger, the localized bending area yielding to deflect the low pressure plucking section to a substantially inoperative angle when the fowl is presented to the advancing finger at high pressure, thereby to present the high pressure plucking section to the surface of the fowl, the localized bending area presenting the low pressure plucking section to the surface of the fowl at a decreased angle when the fowl is presented to the advancing finger at lower pressure.

2. A feather plucking finger adapted to be installed on the rotary drum of a fowl defeathering machine, said finger providing selectively a high pressure plucking action for removing outer feathers and a low pressure plucking action for removing the inner feathers in response to the pressure of the fowl against the finger, said finger having a base adapted to anchor the finger upon the periphery of the rotary drum with the finger projecting radially therefrom, the projecting portion of the finger being cylindrical, said finger formed of flexible rubber having a substantial bending resistance, the finger having a low pressure plucking section at its outer end portion, said section comprising a plurality of relatively fine annular corrugations, said corrugations being V-shaped in profile, a high pressure plucking section intermediate the length of the finger, said high pressure plucking section comprising a plurality of lineally spaced coarse annular corrugations delineated by annular grooves generally U-shaped in profile, each of said coarse grooves being at least twice the width of one of said fine corrugations, the exterior surfaces of the coarse and fine corrugations being flush with one another and with the cylindrical surface of the finger, said coarse annular grooves reducing the cross section of the finger and providing a localized bending area intermediate the length of the finger, the localized bending area yielding to deflect the low pressure plucking section to a substantially inoperative angle when the fowl is presented to the advancing finger at high pressure, thereby to present the high pressure plucking section to the surface of the fowl, the localized bending area presenting the low pressure plucking section to the surface of the fowl at a decreased angle when the fowl is presented to the advancing finger at lower pressure.

References Cited in the file of this patent

UNITED STATES PATENTS

| Number | Name | Date |
|---|---|---|
| 2,300,157 | Hunt | Oct. 27, 1942 |
| 2,376,120 | Campbell et al. | May 15, 1945 |
| 2,571,042 | Kemp | Oct. 9, 1951 |
| 2,603,830 | Barker | July 22, 1952 |

FOREIGN PATENTS

| Number | Country | Date |
|---|---|---|
| 116,500 | Australia | Jan. 27, 1943 |